LIQUID METER

Original Filed Jan. 9, 1967 3 Sheets-Sheet 1

INVENTOR.
ABRAHAM BRANITZKY

BY

M. R. Ketenbaum

ATTORNEY

LIQUID METER

Original Filed Jan. 9, 1967 3 Sheets-Sheet 2

INVENTOR.
ABRAHAM BRANITZKY

BY
M. R. Kedenburg

ATTORNEY

LIQUID METER

Original Filed Jan. 9, 1967 3 Sheets-Sheet 3

INVENTOR.
ABRAHAM BRANITZKY
BY
W. R. Kasten
ATTORNEY

United States Patent Office

Re. 28,000

Reissued Apr. 30, 1974

28,000

LIQUID METER

Abraham Branitzky, Homewood, Ill., assignor to U.S. Meter Corporation, Houston, Tex.

Original No. 3,523,455, dated Aug. 11, 1970, Ser. No. 608,081, Jan. 9, 1967. Application for reissue Aug. 9, 1972, Ser. No. 279,075

Int. Cl. G01f *3/12, 15/14*

U.S. Cl. 73—258 32 Claims

Matter enclosed in heavy brackets [ ] appears in the original patent but forms no part of this reissue specification; matter printed in italics indicates the additions made by reissue.

ABSTRACT OF THE DISCLOSURE

[A liquid meter having an internal shoulder which is diagonally disposed to the major axis of the meter and a measuring chamber within the meter having an external flange which is similarly diagonally disposed. The shoulder and flange seat together to divide the interior of the meter into inlet and outlet compartments.]

*A liquid meter has a central cup-shaped cavity with straight vertical walls and a measuring chamber within the cavity. A pair of vertical partitions extend between the cavity walls and the measuring chamber to divide the cavity into an inlet and an outlet compartment. Other means bar the flow of fluid across the top and bottom of the inlet compartment to the outlet compartment.*

This invention relates to meters and particularly to measuring the flow of liquid in pipes.

For many years, positive displacement meters, oscillating piston and nutating disk, have been the principle meters manufactured in the United States for the ordinary water utility use. In these meters, a separate measuring chamber is located within a meter housing. The piston or disk is fitted within the measuring chamber. The liquid passes into the meter from an inlet, through the measuring chamber, and on through an outlet to its intended use. Within the measuring chamber, the piston or disk cycles in response to the passage of the liquid. As a result, the volume of liquid, such as water, is at once positively displaced and measured. Hence, such meters are aptly termed positive displacement meters.

The cyclic movement of the piston or disk is about a point which usually lies on the axis of rotation of the first member of the gear train which converts the piston motion into units of measure which are recorded on a meter register. Connections from the measuring chamber through to the register can be accomplished by use of a stuffing box assembly or by magnetic coupling.

Another meter type used more frequently in countries foreign to the United States is the vane type meter. In these meters, water passes into the measuring chamber through a number of angularly directed holes spaced around the measuring chamber and impinges upon the vanes or blades, causing them to rotate. This rotation is transmitted by gearing, through a stuffing box or magnetic coupling, to the register.

Meters of any of the types discussed above share certain common disadvantages such as friction loss, high material cost and lack of interchangability as between types. The present invention is directed to overcoming each of these disadvantages and solves them in one meter.

Friction loss is measured in pounds per square inch and reflects the drop in pressure, the head loss, from the main in the street to the house which will be experienced in any given system. Friction loss occurs throughout the system: in the service line, in the house piping, in the valves and fixtures and in the meter. One factor contributing to head loss, in addition to the pipe diameter and the surface drag coefficient of the materials themselves is the degree to which the liquid is subjected to directional changes and constrictions in the meter and elsewhere in the system. Moreover, friction loss in the meter contributes to greater fluctuation of accuracy throughout the range of flow and looses accuracy limits in measuring the liquid flow.

One object of the present invention is to provide a meter having very low friction loss characteristics and hence to provide a larger range of flow for any given fluid pressure.

Another object of this invention is to reduce a minimum the changes of direction and constrictions in a meter by providing a direct coaxial flow path through the inlet and outlet passages of the meter to the measuring chamber.

A further object of this invention is to reduce friction loss characteristics in a meter by dividing the meter internal cavity into relatively large and unconstrained inflow and outflow compartments and greater free flow volume around the measuring chamber into which the inlet and outlet ports of the measuring chamber open.

Another object of this invention is to provide a meter with a greatly reduced accuracy fluctuation throughout the range of flow and with tighter accuracy limits in measuring the liquid flow.

A further object of this invention is to provide a meter configuration which permits fabrication of materials having minimum surface drag coefficient, such as plastic materials. The casings or housings for meters in use at this time are of a non-ferrous metal material, principally bronze. On some meters, the bottom plate is of cast iron for frost protection purposes. These housings are cast. Internally, the housing configuration employs complex shapes of lips, undercuts and channels to provide the means for securing the measuring chamber within the housing and the means for directing the liquid flow within the meter and through the measuring chamber depending upon the type and the particular design of meter involved. These complex internal shapes, while permitting their fabrication expensively in cast metals, frustrate their fabrication in less expensive materials, such as plastic.

Accordingly, another object of this invention is to provide a meter of internal configuration amenable to fabrication in plastic.

A further object of this invention is to provide a meter of simplified internal housing configurations, devoid of undercuts and complex channels, facilitating construction in a simplified manner, including construction in plastic material.

An additional object of this invention is to provide a meter housing in internal configuration which may be used interchangably with measuring chambers operative according to the oscillating piston, nutating disk, or vane principles.

Another cost disadvantage of meters presently in use, relates to the cost disassembly and reassembly for maintenance and repair purposes. Common meter design provides a transparent glass window above the meter register for reading the register. The chamber in which the register is located is desirably moisture-proof and dirt-proof so that a critical seal is effected between the window and the register chamber. The means presently employed for effecting this seal makes the disassembly and reassembly for repair and replacement a relatively costly operation often occasioned by destructive disassembly as a standard technique.

Accordingly, another object of this invention is to provide a meter having a vacuum sealed window over the register chamber which permits rapid assembly, disassembly and reassembly at minimal cost and without destructive disassembly.

These objects are successfully attained in the present invention in which the internal configuration of the meter housing has a diagonal shoulder and the external configuration of the measuring chamber has a diagonal flange. Both shoulder and flange are diagonal with respect to the common plane which contains the centerlines of both the inlet passage and the outlet passage.

The diagonal shoulder and diagonal flange cooperate to locate the measuring chamber within the housing and to divide the housing internal cavity into two compartments, inflow and outflow, between which the liquid passes by way of the measuring chamber. As a result of the diagonal orientation of the shoulder and flange and hence the diagonal separation between the compartments, the inlet and outlet passages to the housing internal cavity can be coaxial throughout and can open directly into the cavity, eliminating all bends and constrictions in the flow path of the liquid from its points of entry and exit at the meter exterior to the free flow volume surrounding the measuring chamber. As another result, the diagonally separated compartments provide a large free flow volume and a large unconstrained cross-sectional area to the fluid as it enters the housing internal cavity from the inlet and outlet passages. Moroever the simple diagonal shoulder and diagonal flange eliminates the complex undercuts, lips, shoulders and channels used in present meters for supporting the measuring chamber and directing the flow of the liquid within the meter. Consequently, the housing can be formed in a simplified inexpensive manner and from less costly materials, such as plastic. Moreover, the measuring chamber can be loose fitting and easily assembled and disassembled without losing the efficiency of the meter.

In addition, one housing having a standard internal diagonal shoulder can be designed for use interchangeable with measuring chambers each having a standard external diagonal flange but employing different measuring mechanisms such as the oscillating piston, nutating disk or vane type.

In another related embodiment, the objects of this invention are obtained through external flanges on the measuring chamber and channels in the housing interior which are oriented normal to the plane common to both the centerlines of the inlet passage and the outlet passage.

Other objects of this invention are obtained in the simple and inexpensive assembly, disassembly and reassembly of the register within the meter, by employing a register chamber under vacuum conditions, which will retain the glass viewing window sealed tightly against a gasket surrounding the chamber. Simple and non-destructive, assembly, disassembly and reassembly can be accomplished by merely placing or removing the glass window from over the register chamber in an evacuated environment, such as a bell jar.

These and other objects and features of the present invention will be more fully understood from the following detailed description with reference to the drawings in which.

Figure 1:
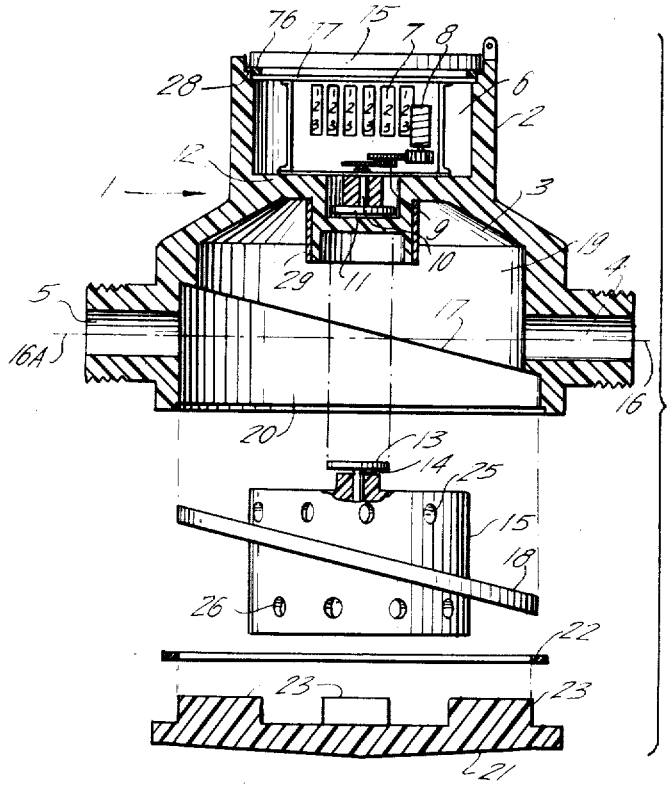
FIG. 1 is an exploded view of a fluid meter suitable for measuring water and employing a measuring chamber of the vane type.

Referring to FIG. 1, a liquid meter, shown generally at 1 has a housing 2 with an internal cavity 3. An inlet passage 4 and an outlet passage 5 lead from the exterior of the housing 2 into the internal cavity 3. Positioned above the internal cavity 3 and fully separated from it by a barrier 12 is a register chamber 6 having a register 7 positioned within it. The register 7 is driven by the gear train 8, the first gear 9, of which is connected by a shaft 10 to a disk-shaped magnet 11. The centerlines 16 and 16A of inlet passage 4 and outlet passage 5 are in a common plane and advantageously the passages are coaxial.

The housing 2 has an internal shoulder 17 which is diagonally disposed with respect to the centerlines 16 and 16A of the inlet passage 4 and outlet passage 5. The shoulder 17 extends from above either one of the passages, in this case outlet passage 5 to below the other passage, in this case inlet passage 4.

Magnet 11 is coupled magnetically across the barrier 12 to a disk-shaped magnet 13 affixed at the end of shaft 14 which extends into the measuring chamber 15. The magnets 11 and 13 are shielded by magnetic shield 29.

Measuring chamber 15 has a surrounding external flange 18. In assembled condition, the shoulder of flange 18 fits up against shoulder 17 so as to be diagonally disposed with respect to the centerlines 16 and 16A. In assembled condition, the diagonal shoulder 17 and the diagonal flange 18 cooperate to divide the internal cavity 3 into two compartments, an inlet compartment 19 and an outlet compartment 20. The liquid passes from the inlet compartment 19 to the outlet compartment 20 by way of the measuring chamber 15. Bottom plate 21 is a closure member which encloses the measuring chamber 15 within the housing 2 and the closure is sealed by gasket ring 22. Bottom plate 21 has lugs 23 extending to contact the measuring chamber 15 and maintain it fast against the internal shoulder 17.

The register chamber is intended to be dirt-proof and moisture-proof. To accomplish this, the register chamber 6 is placed under vacuum conditions during assembly, the register 7 and the register frame 77 being fixed within the register chamber 6. A gasket 76 and transparent glass 75 are positioned over an internal shoulder 78 near the rim of the register chamber 6. When the meter is removed from the evacuated environment, the vacuum conditions within the register chamber 6 will hold the glass 75 fast over it.

For easy disassembly, the meter is merely placed in an evacuated environment, such as within a bell jar, so that the pressure is more nearly equalized on both sides of the glass 75. The glass 75 can then be simply lifted from off the vacuum chamber 6.

Figure 2:
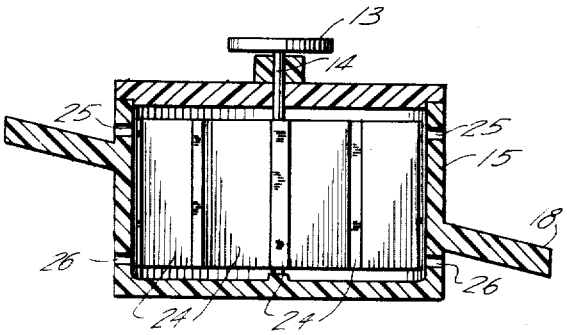
FIG. 2 is a sectional view of a vane type measuring chamber in accordance with the invention.

Referring to FIG. 2, in a vane type measuring chamber 15, the shaft 14 is rotatable within the measuring chamber 15 and passes through a vane wheel 24. The vane wheel 24 rotates within the measuring chamber 15 due to the propelling force of the liquid which enters the chamber through inlet holes 25 and exits the chamber through outlet holes 26. The inlet holes 25 and outlet holes 26 are disposed on opposite sides of the flange 18.

Figure 3:
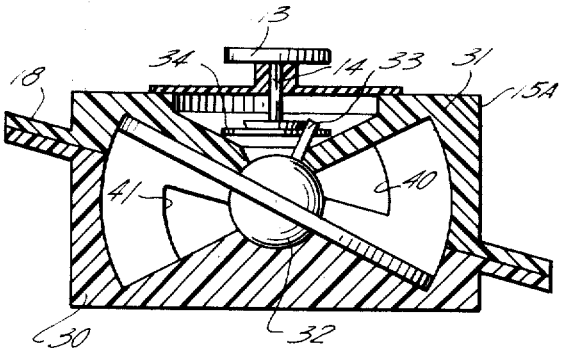
FIG. 3 is a sectional view of a nutating disk type measuring chamber in accordance with the invention.

FIG. 3 shows a measuring chamber 15A of the nutating disk type which may be interchangeable with the vane type measuring chamber 15 in the housing 2. The measuring chamber 15A is comprised of two pieces 30 and 31 within which the nutating disk member 32 wobbles in response to the passage of fluid through the measuring chamber. The wobble motion produces a movement in pin 33 atop the disk member 32. The pin 33 in turn moves the dog 34 which rotates the shaft 14 and the disk-shaped magnet 13. Inlet port 40 and outlet port 41 are on opposite sides of the diagonal flange 18 relative to each other.

Figure 4:
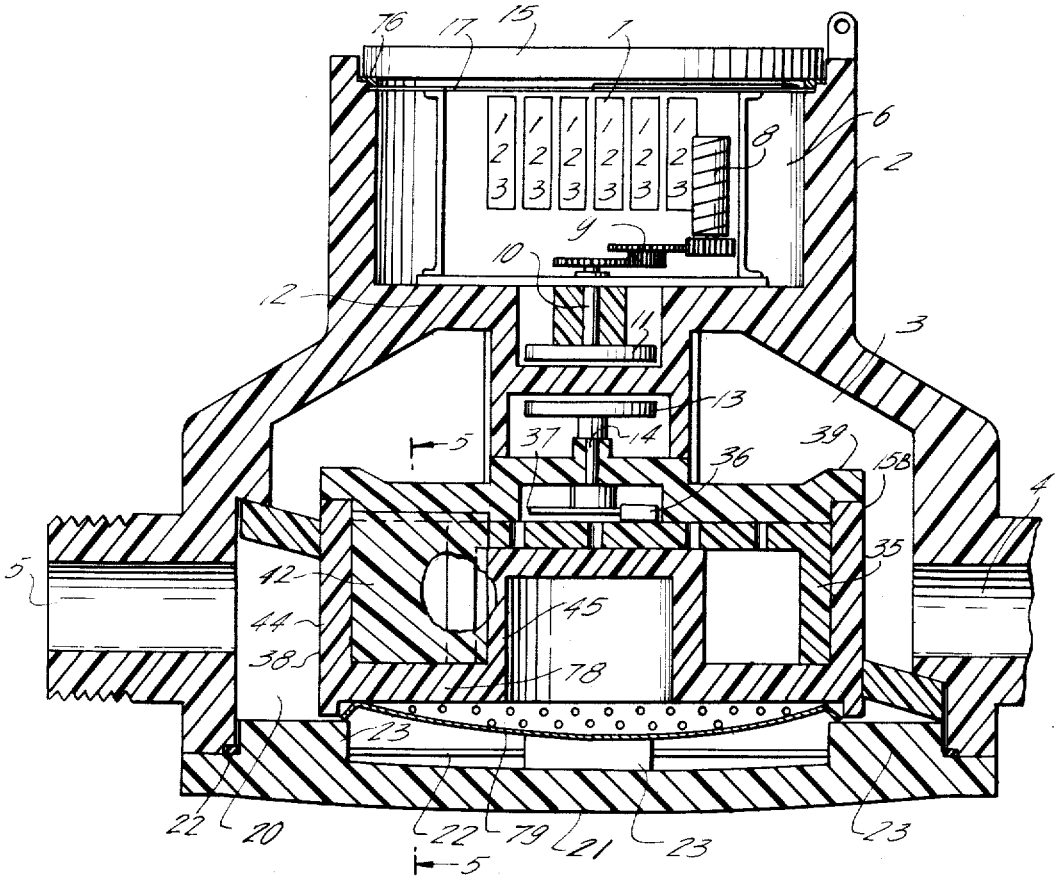
FIGS. 4 and 5 are views of an oscillating piston type measuring chamber in accordance with the invention.
Figure 5:
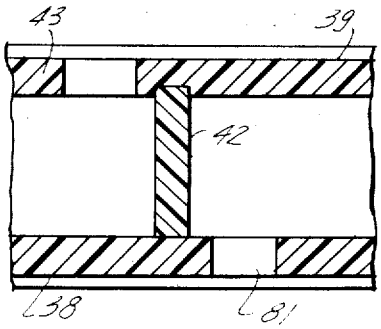

FIGS. 4 and 5 show the measuring chamber 15B which is of the oscillating piston type and may be interchangeable with the measuring chambers of the vane type 15 and nutating disk type 15A in the housing 2. The piston 35 moves within the measuring chamber 15B causing the button 36 to rotate dog 37, shaft 14 and disk-shaped magnet 13.

The measuring chamber 15B is composed of a cup 38 and a cover 39. The piston 35 moves within the measuring cup 38 between its outer wall 44 and inner wall 45. A division plate 42 is inserted between the walls 44, 45 within the cup 38. The piston 35 is opened on its cylindrical wall and its base to admit the division plate 42. An inlet port 43 is located in the cover 39 on one side of the division plate 42. An outlet port 81 is located in the chamber bottom 98, on the other side of the division plate 42 and on the opposite side of the flange 18 with respect to the inlet port 43. Cup-shaped screen 79 is fitted beneath the chamber and is held in place by lugs 23 and in turn holds the measuring chamber 15B in place. The internal shoulder 17 and the external flange 18 divide the internal cavity 3 into two diagonally separated compartments 19 and 20. Because the separation between compartments and hence between inlet and outlet passages is diagonal, the inlet passage 4 and the outlet passage 5 can be straight and coaxial throughout. The flow path of the fluid goes through the inlet passage 4 and to the measuring chamber 15 within the cavity 3 without directional change and similarly with the flow path of the fluid through the outlet passage. All constrictions and directional changes to the flow path through the inlet and outlet passages are eliminated, reducing friction loss within the meter.

Moreover, the various undercuts and channels which usually provide the flow path around the measuring chamber are also eliminated so that the housing can be conveniently formed in plastic. Additionally, the coaxial inlet and outlet passages open directly into a large free flow volume within the internal cavity 3, further reducing friction loss in the meter.

With plastic material of low drag coefficient and other friction losses thus reduced, the meter provides a larger range of flow for any given fluid pressure and a greatly reduced accuracy fluctuation throughout the range of flow and with tighter accuracy limits. Additionally, the measuring chamber can be relatively loose fitting within the meter housing without sacrificing these efficiencies.

Figure 6:
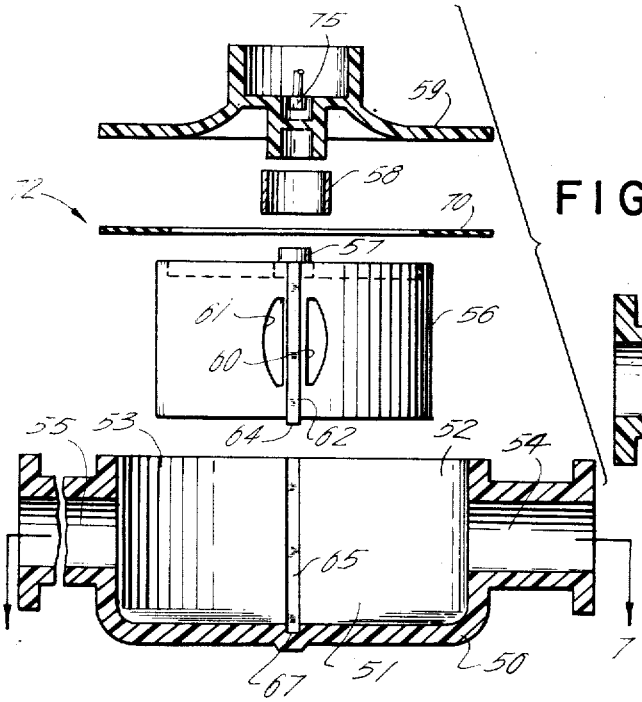
FIG. 6 is an exploded view of a fluid meter suitable for measuring water and employing a measuring chamber of either the oscillating piston or nutating disk type.
Figure 7:
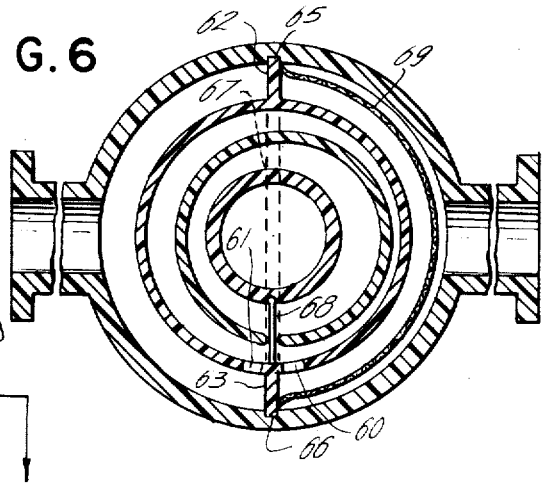
FIG. 7 is a sectional view of the measuring chamber taken through section line 7—7 in FIG. 6.

Another embodiment providing these same advantages is shown in FIGS. 6 and 7. A meter shown generally at 72 has a housing body 50 and a housing cover member 59. The housing body 50 has an internal cavity 51 which is divided into inlet and outlet compartments, in this case inlet compartment 52 and outlet compartment 53. The cavity 52 forms a cup-shaped portion in that the housing walls do not overlie the cavity. The cup-shaped portion could open upward as shown in FIG. 6 or open downward similar to FIG. 4, in which case the cover would be at the bottom. Inlet pasage 54 and outlet passage 55 have centerlines in a common plane and advantageously are coaxial. Measuring chamber 56 is located within cavity 51 and has external flanges 62, 63 and 64 which rest within internal channels 65, 66 and 67 respectively. The cooperation of these flanges and channels provide the sealed separation between the compartments 52 and 53 whereby the fluid passes between compartments by way of the measuring chamber 56. The flanges 62 and 63 along the side of the measuring chamber 50 and the channels 65 and 66 are normal to the centerlines of passages 54 and 55. Channel 67 extends between channels 65 and 66. The channels 65 and 66 are each positioned between the inlet passage 54 and the outlet passage 55, but on opposite sides of these passages relative to each other.

The measuring chamber 56 can be of the oscillating piston or nutating disk type. The inlet port 60 and the outlet port 61 are located on opposite sides of flange 63 and close thereto. Division plate 68 extends into the measuring chamber 55 adjacent flange 63.

A screen 69 is positioned between the inlet passage 54 and the measuring chamber 56, particularly the inlet port 60.

Cyclic movement of the mechanism within the measuring chamber 56 will result in rotation of the cylindrical magnet 57 which is magnetically coupled to member 75. Shield 58 surrounds magnet 57. The measuring chamber 56 is sealed at its top against housing cover member 59 by gasket ring 70.

Figure 8:
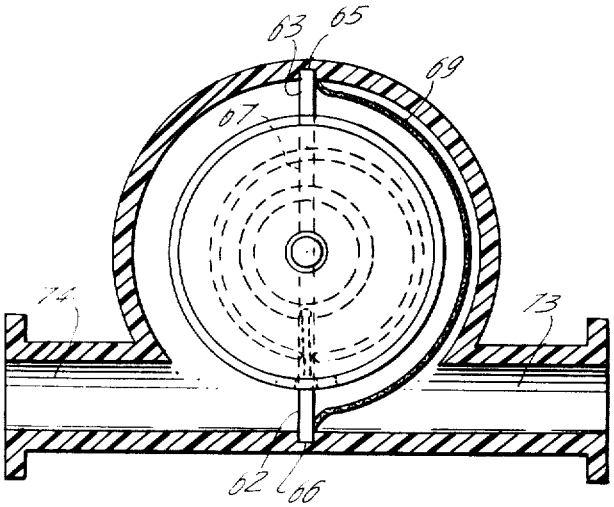
FIG. 8 is a top sectional view of a modification of the meter shown in FIGS. 6 and 7.

FIG. 8 shows a modification to the embodiment shown in FIGS. 6 and 7, in that the coplanar inlet passage 73 and outlet passage 74 are offset with respect ot the centerline of the measuring chamber 56.

It should be understood that specific embodiments have been described for purposes of explanation and understanding and that changes and modifications can be made to these specific embodiments without departing from the spirit and teachings of the present invention in accordance with the following claims. For example, the inlet passages, ports and flow paths can be interchanged with the outlet passages, ports and flow paths.

What is claimed is:

1. A liquid meter comprising a housing having an open cup-shaped portion and a cover for said cup, said cup-shaped portion being formed by a centrally located cavity comprising substantially a straight-sided vertical circular cylindrical cavity, and an inlet passage and an outlet passage to said cavity, the centerlines of said passages lying in a common plane; a measuring chamber within said cavity comprising substantially a straight-sided vertical circular cylinder concentric with said cavity and having means therein moveable in response to the passage of fluid through said chamber; a pair of vertically oriented partitions each of which extends between the side of said cavity and the side of said measuring chamber to provide fluid barrier means dividing said cavity into an inlet and an outlet compartment, each of said partitions being positioned between said inlet passage and said outlet passage and on opposite sides of said passages relative to each other, said measuring chamber having an inlet port and an outlet port disposed on opposite sides of one of said partitions and a division plate within said measuring chamber, and means within said cavity for sealing between said housing and the top and bottom of said measuring chamber.

2. A liquid meter in accordance with claim 1 in which said sealing means at the bottom of said measuring chamber comprises a bottom portion having a channel therein extending between said pair of vertically oriented partitions and a horizontally oriented partition on said measuring chamber adapted to rest within said channel.

3. A liquid meter in accordance with claim 1 in which said inlet passage and said outlet passage comprise coaxial conduits offset with respect to the centerlines of said measuring chamber, said conduits opening directly into said cavity.

4. A liquid meter in accordance with claim 1, in which each of said compartments has a cross-sectional area near respective ones of said passages which is substantially larger than the cross-sectional area of said passage, both of said cross-sections being normal to the direction of flow within said passages.

5. A liquid meter in accordance with claim 1 in which said housing has a pair of vertically oriented internal channels, each of said channels being positioned between said inlet passage and said outlet passage and on opposite sides of said passages relative to each other, said vertically oriented partitions extending from said measuring chamber and adapted to rest within said channels.

6. A liquid meter in accordance with claim 5 in which said vertically oriented partitions comprise vertically oriented external flanges on said measuring chamber.

7. A liquid meter in accordance with claim 1 comprising a second cavity positioned above said cavity and isolated therefrom by an airtight partition, a register within said second cavity communicating across said airtight partition with the means in said measuring chamber for registering the passage of fluid through said measuring chamber, said second cavity opening outwardly at one end and having a shoulder portion surrounding its open end, a gasket deformable under atmospheric pressure positioned upon said shoulder portion and a transparent window positioned upon said gasket, said second cavity being under vacuum conditions whereby said window is maintained fixed to said housing and sealed over said second cavity by atmospheric pressure.

8. A liquid meter in accordance with claim 1 in which the outside diameter of said measuring chamber is substantially less than the inside diameter of said centrally located cavity.

9. A liquid flowmeter comprising a housing having an open cup-shaped portion and a cover for said cup, said cup-shaped portion being formed by a wall forming a vertical axis cavity therein, said wall being free of substantial horizontal undercutting, circumferentially spaced-apart inlet and outlet passages through the wall of said housing communicating with said cavity, a measuring chamber within said cavity, means in said measuring chamber moveable in response to the flow of fluid through said chamber, a pair of vertical partitions each extending between the wall of the housing and the measuring chamber providing means dividing said cavity into inlet and outlet compartments communicating with said inlet and outlet passages, respectively, means barring the flow of fluid across the top and bottom of said measuring chamber, and an inlet and an outlet port in said chamber communicating with said inlet and outlet compartments, respectively.

10. A liquid flowmeter as defined by claim 9 in which said housing has a pair of vertically oriented internal channels, each of said channels being positioned between said inlet passage and said outlet passage and on opposite sides of said passages relative to each other, said vertically oriented partitions extending from said measuring chamber and adapted to rest within said channels.

11. A liquid flowmeter as defined by claim 9 wherein the walls of said cavity are substantially straight.

12. A liquid flowmeter as defined by claim 9 wherein said cavity is substantially a right circular cylinder in configuration.

13. A liquid flowmeter comprising a housing having an open cup-shaped portion and a cover for said cup, said cup-shaped portion being formed by a wall forming a vertical axis cavity therein, the internal spacing between horizontally opposed portions of the wall being at least maintained from one end portion of the cavity to the other, circumferentially spaced-apart inlet and outlet passages through the wall of said housing communicating with said cavity, a measuring chamber within said cavity spaced away from said wall to leave a space therebetween, a pair of vertical partitions each extending between the wall of the housing and the measuring chamber providing means dividing said cavity into inlet and outlet compartments communicating with said inlet and outlet passages, respectively, means barring the flow of fluid across the top and bottom of said measuring chamber, an inlet and an outlet port in said measuring chamber communicating with said inlet and outlet compartments, respectively, means in said measuring chamber moveable relatively thereto in response to and in proportion to the flow of fluid through said chamber, and means on said housing adapted to indicate the flow of fluid therethrough in response to the movement of said moveable means.

14. A liquid flowmeter as defined by claim 13 in which said housing has a pair of vertically oriented internal channels, each of said channels being positioned between said inlet passage and said outlet passage and on opposite sides of said passage relative to each other, said vertically oriented partitions extending from said measuring chamber and adapted to rest within said cahnnels.

15. A liquid flowmeter as defined by claim 13 wherein the walls of said cavity are substantially straight.

16. A liquid flowmeter as defined by claim 13 wherein said cavity is substantially a right circular cylinder in configuration.

*17. A liquid meter comprising a housing having an open cup-shaped portion and a cover for said cup, said cup-shaped portion being formed by a centrally located cavity comprising substantially a straight-sided vertical circular cylindrical cavity, and an inlet passage and an outlet passage to said cavity, the centerlines of said passages lying in a common plane; a measuring chamber within said cavity comprising substantially a straight-sided vertical circular cylinder concentric with said cavity and having means therein moveable in response to the passage of fluid through said chamber; a pair of vertically oriented partitions each of which extends between the side of said cavity and the side of said measuring chamber to provide fluid barrier means dividing said cavity into an inlet and an outlet compartment, each of said partitions being positioned between said inlet passage and said outlet passage and on opposite sides of said passages relative to each other, said measuring chamber having an inlet port and an outlet port disposed on opposite sides of one of said partitions and a division plate within said measuring chamber, and means within said cavity for barring the flow of fluid across the top and bottom of said inlet compartment to said outlet compartment.*

*18. A liquid meter in accordance with claim 17 in which said means for barring the flow of fluid across the bottom of said inlet compartment to said outlet compartment comprises a bottom portion having a channel therein extending between said pair of vertically oriented partitions and a horizontally oriented partition on said measuring chamber adapted to rest within said channel.*

*19. A liquid meter in accordance with claim 17 in which said inlet passage and said outlet passage comprise coaxial conduits offset with respect to the centerlines of said measuring chamber, said conduits opening directly into said cavity.*

*20. A liquid meter in accordance with claim 17 in which each of said compartments has a cross-sectional area near respective ones of said passages which is substantially larger than the cross-sectional area of said passage, both of said cross-sections being normal to the direction of flow within said passages.*

*21. A liquid meter in accordance with claim 17 in which said housing has a pair of vertically oriented internal channels, each of said channels being positioned between said inlet passage and said outlet passage and on opposite sides of said passages relative to each other, said vertically oriented partitions extending from said measuring chamber and adapted to rest within said channels.*

*22. A liquid meter in accordance with claim 21 which said vertically oriented partitions comprise vertically oriented external flanges on said measuring chamber.*

*23. A liquid meter in accordance with claim 17 comprising a second cavity positioned above said cavity and isolated therefrom by an airtight partition, a register within said second cavity communicating across said airtight partition with the means in said measuring chamber for registering the passage of fluid through said measuring chamber, said second cavity opening outwardly at one end and having a shoulder portion surrounding its open end, a gasket deformable under atmospheric pressure positioned upon said shoulder portion and a transparent window positioned upon said gasket, said second cavity being under vacuum conditions whereby said window is maintained fixed to said housing and sealed over said second cavity by atmospheric pressure.*

*24. A liquid meter in accordance with claim 17 in which the outside diameter of said measuring chamber is*

*substantially less than the inside diameter of said centrally located cavity.*

*25. A liquid flowmeter comprising a housing having an open cup-shaped portion and a cover for said cup, said cup-shaped portion being formed by a wall forming a vertical axis cavity therein, said wall being free of substantial horizontal undercutting, circumferentially spaced-apart inlet and outlet passages through the wall of said housing communicating with said cavity, a measuring chamber within said cavity, means in said measuring chamber moveable in response to the flow of fluid through said chamber, a pair of vertical partitions each extending between the wall of the housing and the measuring chamber providing means dividing said cavity into inlet and outlet compartments communicating with said inlet and outlet passages, respectively, means barring the flow of fluid across the top and bottom of said inlet compartment to said outlet compartment, and an inlet and an outlet port in said chamber communicating with said inlet and outlet compartments, respectively.*

*26. A liquid flowmeter as defined by claim 25 in which said housing has a pair of vertically oriented internal channels, each of said channels being positioned between said inlet passage and said outlet passage and on opposite sides of said passages relative to each other, said vertically oriented partitions extending from said measuring chamber and adapted to rest within said channels.*

*27. A liquid flowmeter as defined by claim 25 wherein the walls of said cavity are substantially straight.*

*28. A liquid flowmeter as defined by claim 25 wherein said cavity is substantially a right circular cylinder in configuration.*

*29. A liquid flowmeter comprising a housing having an open cup-shaped portion and a cover for said cup, said cup-shaped portion being formed by a wall forming a vertical axis cavity therein, the internal spacing between horizontally opposed portions of the wall being at least maintained from one end portion of the cavity to the other, circumferentially spaced-apart inlet and outlet passages through the wall of said housing communicating with said cavity, a measuring chamber within said cavity spaced away from said wall to leave a space therebetween a pair of vertical partitions each extending between the wall of the housing and the measuring chamber providing means dividing said cavity into inlet and outlet compartments communicating with said inlet and outlet passages, respectively, means barring the flow of fluid across the top and bottom of said inlet compartment to said outlet compartment, an inlet and an outlet port in said measuring chamber communicating with said inlet and outlet compartments, respectively, means in said measuring chamber moveable relatively thereto in response to and in proportion to the flow of fluid through said chamber, and means on said housing adapted to indicate the flow of fluid therethrough in response to the movement of said moveable means.*

*30. A liquid flowmeter as defined by claim 29 in which said housing has a pair of vertically oriented internal channels, each of said channels being positioned between said inlet passage and said outlet passage and on opposite sides of said passage relative to each other, said vertically oriented partitions extending from said measuring chamber and adapted to rest within said channels.*

*31. A liquid flowmeter as defined by claim 29 wherein the walls of said cavity are substantially straight.*

*32. A liquid flowmeter as defined by claim 29 wherein said cavtiy is substantially a right circular cylinder in configuration.*

References Cited

The following references, cited by the Examiner, are of record in the patented file of this patent or the original patent.

UNITED STATES PATENTS

| | | | |
|---|---|---|---|
| 320,577 | 6/1885 | Nash | 73—257 |
| 1,856,850 | 5/1932 | Marden | 73—257 |
| 2,246,250 | 6/1941 | Hanks | 73—258 |
| 2,921,468 | 1/1960 | Treff et al. | 73—258 |
| 2,960,074 | 11/1960 | Zayada | 73—258 |
| 2,972,886 | 2/1961 | Hanks | 73—258 |
| 3,071,003 | 1/1963 | Brette | 73—273 |
| 3,289,476 | 12/1966 | Brette | 73—258 |

FOREIGN PATENTS

| | | | |
|---|---|---|---|
| 442,098 | 6/1912 | France | 73—257 |
| 454,609 | 5/1913 | France | 73—257 |
| 494,507 | 6/1919 | France | 73—257 |
| 471,780 | 6/1914 | France | 73—257 |
| 530,937 | 7/1931 | Germany | 73—257 |
| 530,938 | 7/1931 | Germany | 73—257 |
| 909,302 | 10/1962 | Great Britain. | |

HERBERT GOLDSTEIN, Primary Examiner

U.S. Cl. X.R.

73—273